June 16, 1959  S. W. HOBDAY  2,890,671
HYDROFOIL WATERCRAFT
Original Filed Oct. 29, 1948  3 Sheets-Sheet 2
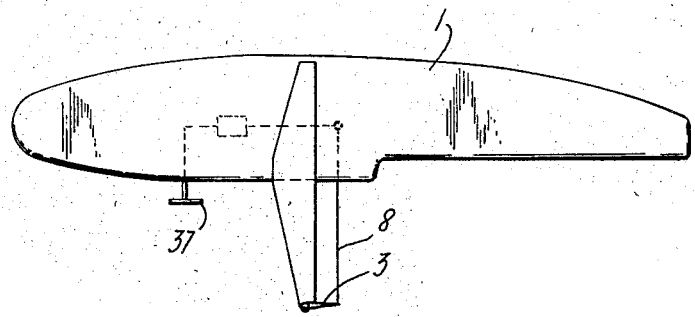
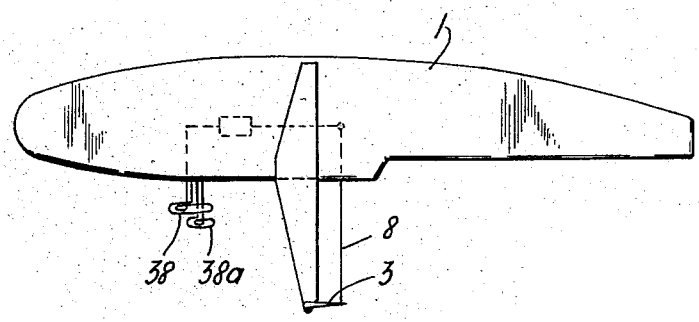
Inventor
STEPHEN W. HOBDAY
By
Wenderoth, Lind & Ponack
Attorneys United States Patent Office 2,890,671
Patented June 16, 1959

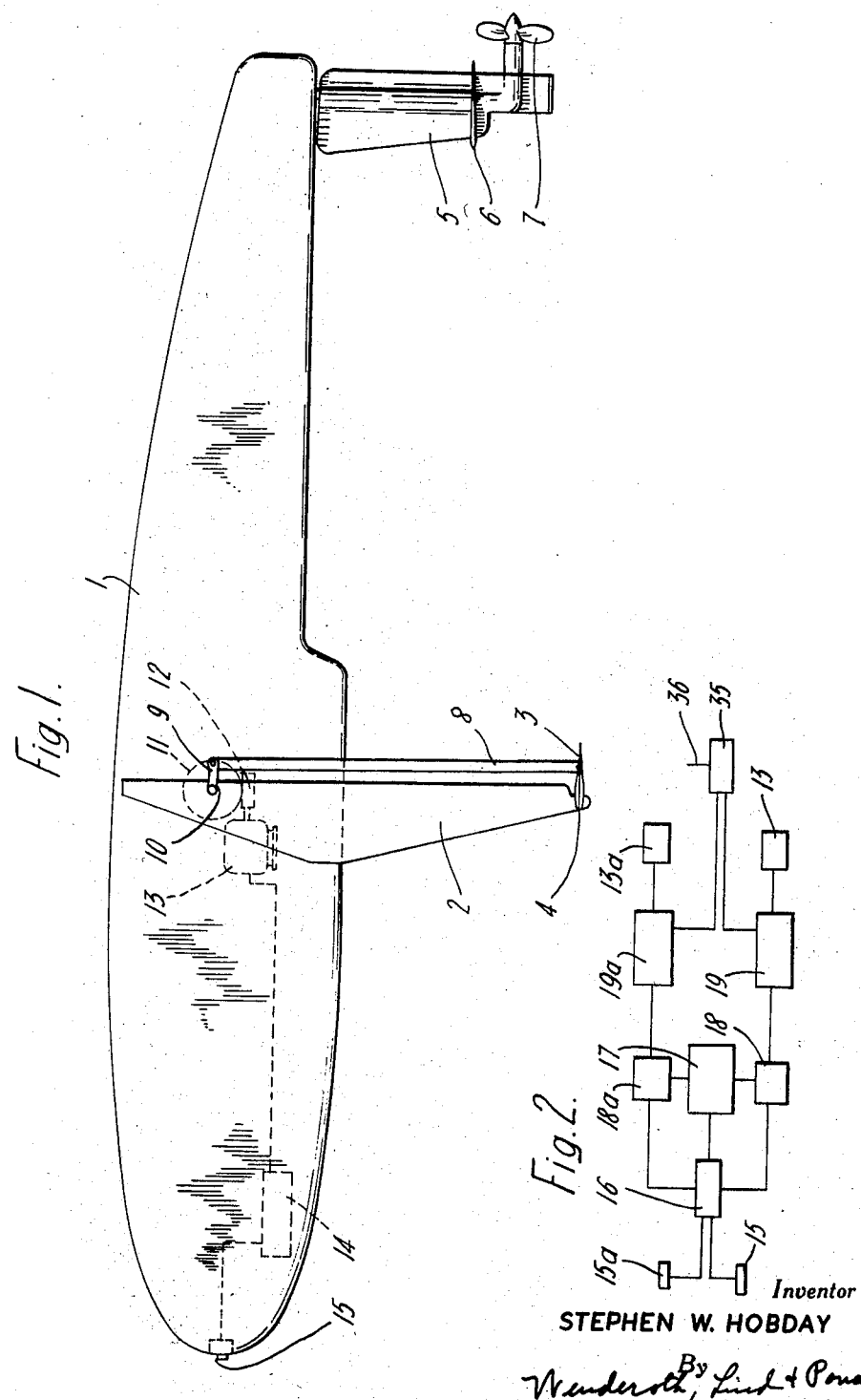

2,890,671

HYDROFOIL WATERCRAFT

Stephen William Hobday, Hants, England

Original application October 29, 1948, Serial No. 57,276, now Patent No. 2,722,189, dated November 1, 1955. Divided and this application June 27, 1955, Serial No. 518,279

Claims priority, application Great Britain October 29, 1947

7 Claims. (Cl. 114—66.5)

This invention relates to improvements in craft adapted to travel on water and having one or more hydrofoils for imparting a lift to the craft when it is making way. The present application is a division from my parent patent application Serial No. 57,276, filed October 29, 1948, now Patent No. 2,722,189, dated November 1, 1955.

Heretofore craft have been proposed in which variable pitch hydrofoils are pivotally mounted on struts extending downwardly from the craft so that at predetermined speeds the hydrofoils, which are submerged, lift all or a part of the hull of the craft above the surface of the water.

It has also been proposed in craft of this kind to vary automatically the pitch of the hydrofoils according to their depth beneath the surface by means of a controlling float or skid which skims the surface of the water. This float or skid may also be fitted with a device such as a dash-pot to retard its downward movement.

In craft utilising a float which skims the surface of the water to control the hydrofoils, the control movements may follow very rapidly one upon the other as would be the case when the craft is in a short sea, moreover the float undergoes a very wide range of movement as it passes from a trough to a wave-crest.

The object of the present invention is to provide a control device which whilst being readily responsive to the irregularities of water surface caused by waves, is capable of exercising a control in which irregularities in water surface are averaged out to give a smooth control that is responsive to the general condition of the sea rather than an instantaneous condition in the vicinity of the control device.

A further object of the invention is to provide a control device by means of which the craft can be lifted clear of the water surface by an amount varying with the roughness of the water.

A further object of the invention is to provide control means which in the case of small waves will maintain the craft a small amount above the average water level, which in the case of larger waves will maintain the craft proportionately higher, and which in the case of very large waves will control the craft to follow the contour of the water surface.

According to the present invention a craft is provided adapted to travel on undulating water and become lifted therefrom when under way, comprising in combination a hull and a structure depending therefrom into the water, means tiltably mounted on the lower end of said structure and presenting a submerged hydrofoil craft-lifting surface to the water, measuring means mounted on the hull ahead of the hydrofoil and sensitive to the instantaneous distance between it and the water surface, and transmission means extending from said measuring means to said tiltable hydrofoil means serving to automatically regulate the tilt according to the said instantaneous distance which varies with variations in wave formation.

In carrying the invention into effect, the craft is provided upon either side with a downwardly extending strut means on each of which is pivotally mounted a hydrofoil. A third or stabilising hydrofoil may also be arranged near the bow or stern of the craft.

The measuring means for varying the pitch of the tiltable hydrofoils is carried either in the bow of the craft or out ahead of the craft on a spar or like fixture. The measuring means, which may include transmitting and receiving units hereinafter more fully described, is coupled by electrical, mechanical, hydraulic or pneumatic means or by a combination of these, to means, such as a servo-motor, for varying the angle of incidence of each of the variable pitch hydrofoils.

A number of well-known control systems can be adapted for use as the measuring means, and in order that the invention may be more readily understood reference will be made to the accompanying drawings.

In the drawings:

Figure 1 is a side elevation of a hydrofoil craft in which the control system for the hydrofoils is diagrammatically represented.

Figure 2 is a block diagram of the control circuit used in Figure 1.

Figures 3 and 4 illustrate diagrammatically two further control arrangements in accordance with the invention.

Figure 5:
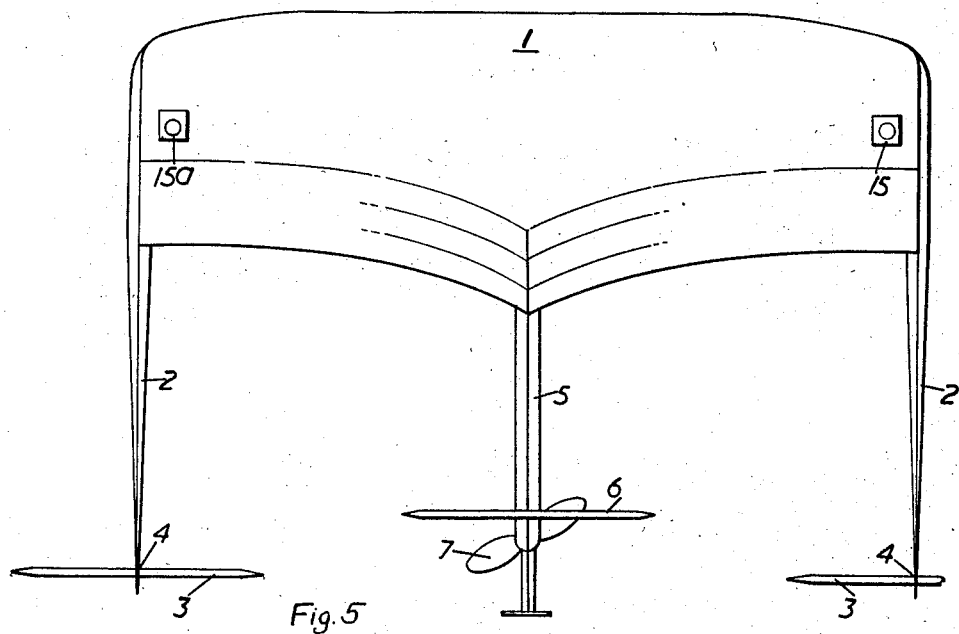
Fig. 5 is a front elevation of one embodiment of the hydrofoil craft according to the invention.
Figure 6:
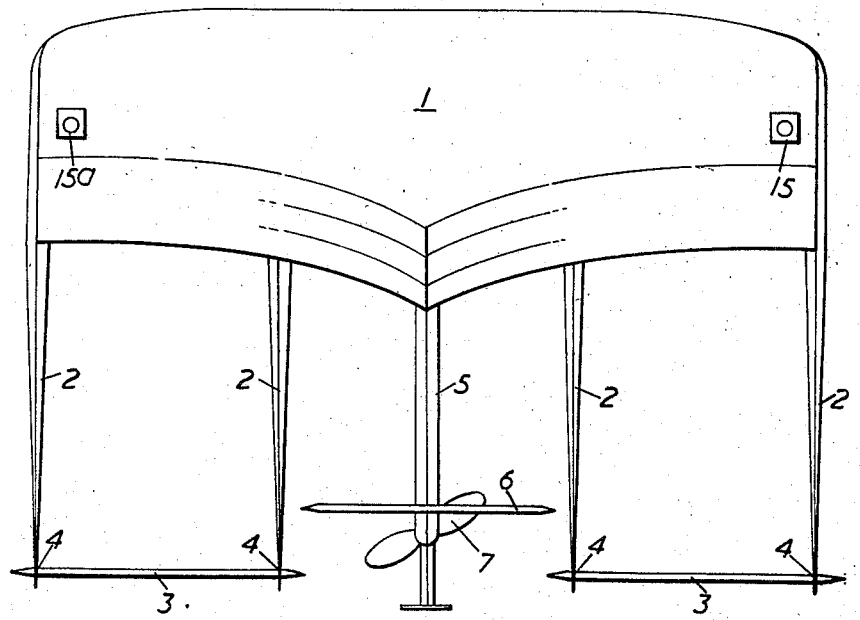
Fig. 6 is a front elevation of another embodiment of a hydrofoil craft according to the invention.

The control system shown in Figures 1 and 2 is that known as sonar, which is a system analogous to radar, in which a pulse of sonic or supersonic air waves is transmitted downwards towards the water by means of a suitable transmitter and the pulse reflected from the surface is received by a suitable receiver. As in radar, the time interval between transmitting the pulse and receiving the reflected pulse is measured and this information is passed to a control circuit which exercises control of the hydrofoils in accordance with the height of the measuring means above the water surface. In Figure 1 the hull 1 is provided on each side with strut means, in the embodiment of Fig. 5 single struts 2, and in the embodiment of Fig. 6 double struts 2, upon which a variable pitch hydrofoil 3 is mounted on pivots 4. The hull is also provided in its stern with a further strut 5 which carries a fixed or manually adjustable hydrofoil 6. The strut 5 which can be used as a rudder also carries a screw 7 and serves as a housing for the drive to the screw.

The pitch of the hydrofoil 6 is pre-adjusted, and the pitch of each of the hydrofoils 3 is adjustable under control of the measuring means to lift the hull 1 out of the water when the craft is making way.

The pitch of each hydrofoil 3 is varied by tilting it about its pivot 4 by means of a connecting link 8 which is attached at its upper end to a crank 9 mounted on a shaft 10. The shaft 10 is rocked by means of a gear 11 and worm wheel 12 driven by a servo-motor 13.

The two servo-motors 13 and 13a respectively controlling each hydrofoil 3 are under the control of a control circuit diagrammatically shown at 14 which is in turn controlled by a pair of sensitive elements in the form of transmitter-receiver heads 15 and 15a mounted on the bow of the craft, above the water.

The control circuit which is shown in the block diagram in Figure 2 includes a transmitter 17 and a pair of receivers 18 and 18a which are connected to the respective transmitter-receiver heads 15 and 15a through a transmitter-receiver switch 16. The outputs from the receivers 18 and 18a are fed to amplifier and control units 19 and 19a connected to servo-motors 13 and 13a, Normally separate systems are used for the separate hydrofoils to maintain lateral stability and these systems can be interlocked to act on one another and/or control another foil or foils so that they take up an angle or angles intermediate the angles of the directly controlled foils.

In the system so far described the hull 1, when the craft is starting from rest, would be floating on the water and the control derived from the measuring means would be such as to apply the maximum angle of pitch to the hydrofoils 3. In order that the hull may be lifted clear of the water in the shortest time possible, it is desirable that the hydrofoils 3 should remain in a horizontal position giving the least possible drag until the craft has gained sufficient speed for the hydrofoils when inclined to raised the craft from the water.

In the preferred embodiment of the invention the hydrofoils are also under the control of a manual control which is adapted to over-ride or supercede the automatic control whilst the craft is starting from rest. This over-riding control may take the form of a variable resistance or potentiometer shown at 35 (Figure 2) from which a voltage or current is derived whose magnitude depends upon the position of the control lever 36. This voltage or current is applied to over-ride the outputs from the control units 19 and 19a and thus keep the hydrofoils horizontal. When sufficient speed has been attained the lever 36 is moved and this allows the hydrofoils to move and so raise the craft from the water.

The control unit 19 (and 19a) may incorporate a low-pass filter or equivalent and this smooths out the effect of small changes of distance as would be produced by small waves. This action is adjusted so that waves small enough to pass beneath the craft do so without altering the pitch of the hydrofoils. Should a large steep wave arrive however a system responsive to this condition by-passes the filter and causes the hydrofoils to be moved instantly so that the craft rises and rides safely over the top of the wave. In the case of long ocean swells the normal action of the control and filter units causes the craft to ride smoothly and follow their contour.

Reference will now be made to two alternative systems to the sonar system above described and for this purpose particular reference is made to Figures 3 and 4. According to one such alternative system use is made of the principle of variation of electrostatic capacity of insulated conductors in response to the change in distance of part of the craft from the surface of the water. These variations in capacity may be translated by electrical and mechanical, pneumatic or other means to control the angles of incidence of the hydrofoils. In the preferred form of electrostatic capacity control, one or more insulated condenser plates are mounted on the bottom of the craft in an approximately horizontal plane as shown diagrammatically by the condenser plate 37 in Figure 3 of the drawings. The plates are provided with a watertight covering which ensures that they are effectively insulated even though immersed in water. As is well known the capacity of the plate or plates will vary in response to a change in dielectric, such as the institution of an air gap between the plate and the water.

In a further system the inductance of a coil or coils or the mutual inductance of two or more coils is varied by the height above or the depth beneath the surface of a measuring means and this effect is used to control the angles of incidence of the hydrofoils as described above. In the preferred form of variable inductance control, a coil such as 38 seen in Figure 4 is mounted in the craft, and an electrical output can be derived therefrom which will vary in response to a change in the magnetic flux through the coil, the flux changing as the distance between the coil and the water surface changes. In an alternative arrangement which makes use of the mutual inductance of two or more coils, the coils which are closely arranged in parallel planes such as the coils 38 and 38a in Figure 4 overlap one another so that on a change in distance between the coils and the water surface there is a change in magnetic flux through the coils and an electrical output can be derived.

In amplification of the foregoing it will be understood that in order to obtain an indication of variation of inductance it is necessary to pass an alternating current through the coil or coils in order to establish changing magnetic flux through them and the surrounding space, so that the presence of the conducting water surface can be detected. A number of the lines of force from the coil or coils will enter the water surface and set up eddy currents, which in turn produce lines of force opposing the original lines and in this way reducing the magnetic flux of the coil or coils and hence the inductance thereof. The extent of this effect will vary with the number of lines of force entering the water and therefore with the distance between the coil or coils and the water surface. This type of effect is well known to those versed in the art of the design of inductance coils and can be put to practical effect in the control of the hydrofoils.

In each of the above systems in which the control device is electrical it is possible to use a control system incorporating the damping and lost motion effects heretofore described in connection with the sonar control system.

Whilst the invention has been described primarily in connection with sea-borne craft it is also applicable to craft which are adapted to become airborne. For example, variable pitch hydrofoils automatically controlled in accordance with the invention may be fitted to flying boats or seaplanes to assist take-off.

I claim:

1. A craft adapted to travel on undulating water and become lifted therefrom when under way, comprising in combination a hull and a structure depending therefrom into the water, means tiltably mounted on the lower end of said structure and presenting a submerged hydrofoil craft-lifting surface to the water, measuring means mounted on the hull ahead of the hydrofoil for measuring the instantaneous distance between said measuring means and the water surface in terms of a variable electric signal, and transmission means extending from said measuring means to said tiltable hydrofoil means serving to automatically regulate the tilt according to the said instantaneous distance which varies with variations in wave formation.

2. A craft as claimed in claim 1 in which the measuring means is mounted on the hull at its forward end so as to be situated at a predetermined distance above the water surface prevailing when the craft is at rest.

3. A craft as claimed in claim 1 in which the measuring means is mounted on the hull at its forward end so as to be situated at a predetermined distance above the water surface prevailing when the craft is at rest, said measuring means comprising means for transmitting an air pressure wave towards the water surface, means for receiving the echo wave, and means responsive to the echo wave for translating the echo wave into a variable electric signal and actuating the transmission means for the hydrofoil surface.

4. A craft as claimed in claim 1, in which said transmission means comprises servo-motor means actuatable by the measuring means to operate the hydrofoil surface.

5. A craft as claimed in claim 1 wherein the structure depending from the hull of the craft comprises two strut means, one mounted on one side of the craft and the other on the opposite side, and a third strut depending from the stern of the hull, and wherein the hydrofoil craft-lifting surface comprises the surfaces of two tiltable hydrofoils, one hydrofoil on each strut means, and a stabilizing hydrofoil on said third strut means.

6. A craft as claimed in claim 1 in which the measuring means is an electrostatic element which in conjunction with the prevailing water surface serves as an electrical condenser the capacity of which varies with depth of dielectric between said element and said surface.

7. A craft as claimed in claim 1 in which the measuring means is at least one electrical inductance coil which in conjunction with the prevailing water surface undergoes a change in the magnetic flux passing through it as the distance between it and the water surface varies.

References Cited in the file of this patent

UNITED STATES PATENTS

| | | |
|---|---|---|
| 1,924,032 | Fessenden | Aug. 22, 1933 |
| 1,965,147 | Marvel | July 3, 1934 |
| 2,333,688 | Shepard | Nov. 9, 1943 |
| 2,550,220 | Bussei | Apr. 24, 1951 |
| 2,696,796 | Amster | Dec. 14, 1954 |
| 2,709,979 | Bush | June 7, 1955 |

FOREIGN PATENTS

| | | |
|---|---|---|
| 587,317 | Great Britain | Apr. 22, 194 |